United States Patent
Bhatti

(10) Patent No.: US 7,961,627 B2
(45) Date of Patent: Jun. 14, 2011

(54) METHOD AND SYSTEM FOR GENERATING ANTENNA SELECTION SIGNALS IN OFDM TRANSCEIVERS WITH FEWER RF CHAINS THAN ANTENNAS IN MIMO WIRELESS NETWORKS

(75) Inventor: Ghulam M. Bhatti, Mansfield, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 438 days.

(21) Appl. No.: 11/574,922

(22) PCT Filed: Jun. 24, 2005

(86) PCT No.: PCT/US2005/022271
§ 371 (c)(1),
(2), (4) Date: Mar. 8, 2007

(87) PCT Pub. No.: WO2007/001286
PCT Pub. Date: Jan. 4, 2007

(65) Prior Publication Data
US 2011/0002226 A1    Jan. 6, 2011

(51) Int. Cl.
*H04L 12/26* (2006.01)
*H04Q 7/24* (2006.01)

(52) U.S. Cl. ........................................ 370/238; 370/338
(58) Field of Classification Search .................. 370/238, 370/248, 249, 252, 338, 400
See application file for complete search history.

(56) References Cited

U.S. PATENT DOCUMENTS

| | | | |
|---|---|---|---|
| 7,852,778 B1 * | 12/2010 | Kompella | 370/248 |
| 2002/0122410 A1 * | 9/2002 | Kulikov et al. | 370/349 |
| 2004/0102195 A1 * | 5/2004 | Naghian et al. | 455/456.1 |
| 2004/0121786 A1 * | 6/2004 | Radcliffe et al. | 455/500 |
| 2007/0274232 A1 * | 11/2007 | Axelsson et al. | 370/254 |
| 2008/0137580 A1 * | 6/2008 | Axelsson et al. | 370/315 |

\* cited by examiner

*Primary Examiner* — Andrew Lee
(74) *Attorney, Agent, or Firm* — Dirk Brinkman; Gene Vinokur

(57) ABSTRACT

A method and system discovers a route in a wireless communications network including multiple nodes. A RREQ frame is broadcast by a first node. The RREQ frame is generated to discover a route. A second node receives the RREQ frame. The second node unicasts a PING frame to the first node to verify an integrity of a wireless communications channel between the first node and the second node. Then, the second node unicasts a RREP frame only if the integrity of the wireless channel is verified.

18 Claims, 5 Drawing Sheets

100

200

METHOD AND SYSTEM FOR GENERATING ANTENNA SELECTION SIGNALS IN OFDM TRANSCEIVERS WITH FEWER RF CHAINS THAN ANTENNAS IN MIMO WIRELESS NETWORKS

FIELD OF THE INVENTION

This invention relates generally to wireless communications networks, and more particularly to discovering routes in wireless communications networks.

BACKGROUND OF THE INVENTION

A number of different wireless network topologies are known including ad-hoc, sensors, mesh, and ZigBee networks. The ZigBee network is in the form of a tree due to a distributed addressing scheme.

A route in a wireless network includes a source node, a destination node and optional intermediate nodes. Typically, a source node discovers a route by initiating a route discovery procedure before data frames are transmitted to the destination node. Typically, an optimal route is selected based on a least cost that can include a combination of the following factors: number of hops, expected delay, remaining battery life, reliability; and signal strength between the nodes along the route.

When a source node wants to discover a route to a destination node, the source node broadcasts a route request (RREQ) frame. The RREQ frame identifies the source node, the destination node, accumulated cost, and a unique identification (ID) of the RREQ frame. Each node that receives a RREQ frame determines whether the node is the destination node or not. If the node is not the destination node, then the intermediate node updates the cost and rebroadcasts the frame after a predetermined amount delay. The node rebroadcasts the RREQ frame only once unless a frame with a lower cost is received. In this way, the RREQ frame ultimately reaches the destination node, if one exists.

After receiving a RREQ frame, the receiving node also constructs and sends a route reply (RREP) frame to the originating node of the RREQ frame. The RREP frames can eventually reach the source node. The source node examines addresses in the received RREP frames to discover a least cost route.

It is possible for the destination node to receive multiple copies of the RREQ frame via different routes. In this case, the destination replies only to a subsequently received RREQ frame that has a route with a lower cost. This is a problem.

Conventional route discovery methods assume that a node receiving a RREQ frame can respond to the originating node. However, this may not always be true due to transmission asymmetry. There may be several reasons for an asymmetry of transmission among pairs of nodes, e.g., relative geographic locations of nodes, intervening obstructions, available battery power, and antenna configuration.

Consider the example wireless network 100 shown in FIG. 1 for which the invention is intended. That network includes a source node (S) 101, a destination node (D) 102, and intermediate nodes (I) 103. Wireless communications channels link the nodes. The source node broadcasts the RREQ frame 110. Because the source node has sufficient transmission range, the RREQ frame is received by the destination node, as well as some of the intermediate nodes in the network. These intermediate nodes rebroadcast the RREQ frame, and unicast RREP frames.

The transmission range of the destination node is insufficient for the RREP frame 120 to reach the source node. The destination node also receives the RREQ frames rebroadcast by intermediate nodes 115. The transmission range of the destination node is sufficient for the RREP frame 130 to reach the intermediate node. However, the cost of viable routes via the intermediate nodes is higher than the cost of the unviable route directly linking the source node with the destination node. Therefore, the destination node discards the RREQ frames received via the more costly, but viable routes from the intermediate nodes. In other words, route discovery fails in what could otherwise be a fully functional network.

The same problem can exist for intermediate nodes that receive RREQ frames but cannot reach the originating nodes with RREP frames. After a route has been discovered, the same problem can exist for data frames because of dynamically changing network conditions. In other words, transmission asymmetry is a significant problem in wireless communications networks.

It is desired to solve this problem.

In the prior art, it is known how to verify the integrity of a data path and associated routing elements in a wired TCP/IP network, such the Ethernet or the Internet. In wired networks, devices use what is known as an IP 'ping'. The ping takes it name from submarine sonar technology that is used discover underwater objects. Short burst of acoustic signals are send out and one 'listens' for echoes or pings coming back. In an IP network, the ping function broadcasts a short data burst, i.e., a single packet, and listens for a single packet in reply. The broadcast IP ping packet can be communicated indirectly along multiple hops in the network before reaching the destination and returning to the source. Although the ping mechanism has been used in wired IP networks, applicants believe that the ping according to the invention has not been employed in a wireless network as described hereinafter.

SUMMARY OF THE INVENTION

The invention presents a method and system to discover a route in a wireless communications network including multiple nodes. A RREQ frame is broadcast by a source node. A second node receives the RREQ frame. The second node unicasts a PING frame to the first node to verify an integrity of a wireless communications channel between the first node and the second node. Then, the second node unicasts a RREP frame only if the integrity of the wireless channel is verified.

DETAILED DESCRIPTION OF THE PREFERRED EMBODIMENT

A method discovers a route from a source node to a destination node in a wireless communications network. The method uses conventional route request (RREQ), route reply (RREP) frames and unicast PING frames.

It should be noted that unicast PING frames according to one embodiment of the invention for a wireless network are significantly different than traditional broadcast ping messages in a TCP/IP based wired networks, such as the Internet. There, ping messages can be broadcast along multiple hops from the source node to the destination node and back. The PING frames according to one embodiment of the invention are unicast and are only communicated between immediately adjacent nodes, i.e., nodes that are only one hop away and in direct radio communications contact with each other. The PING frames are not sent indirectly to remote nodes, as in the prior art.

PING Frame

Figure 1:
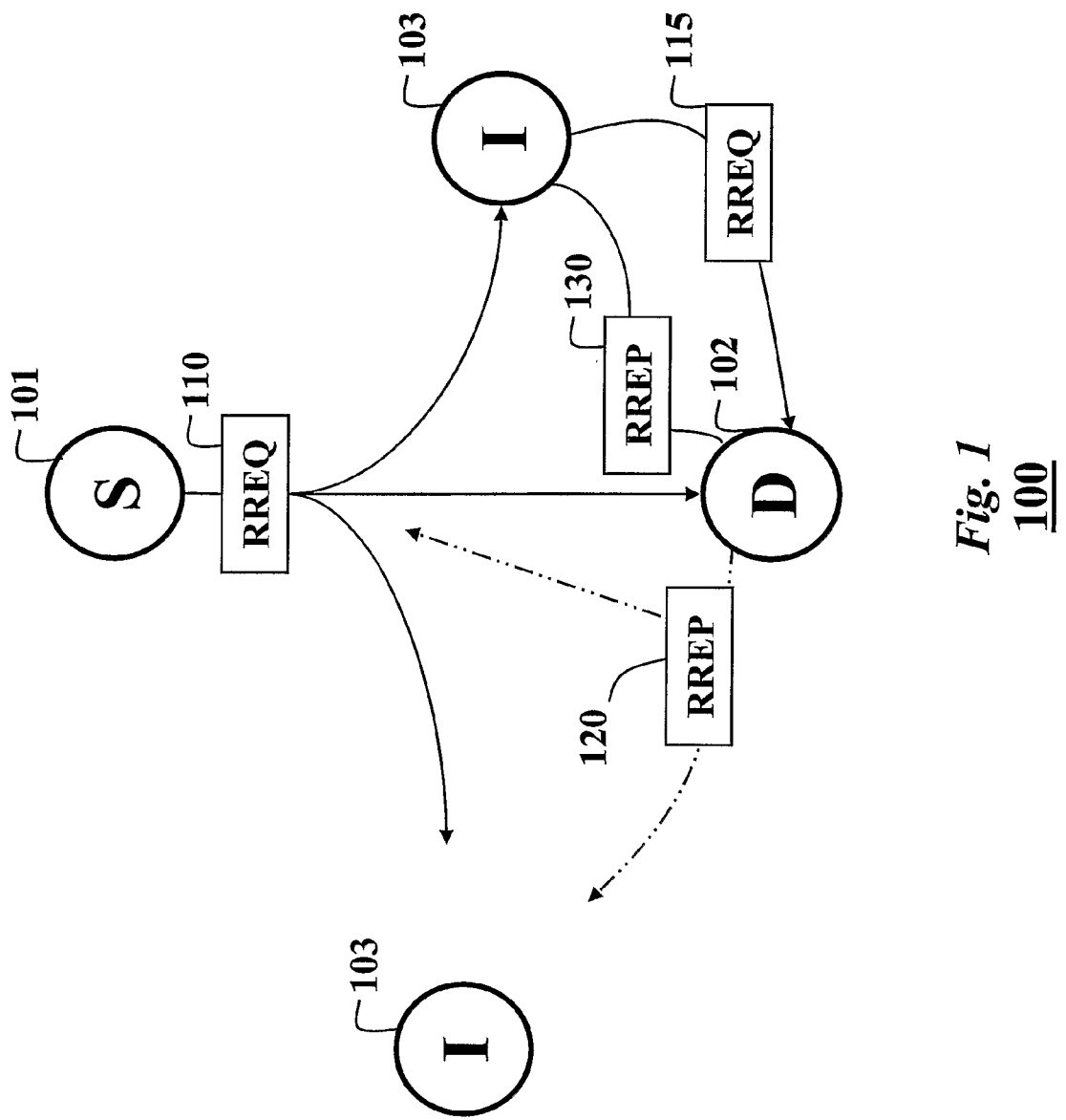
FIG. 1 is a block diagram of a wireless network that can use the invention.
Figure 2:
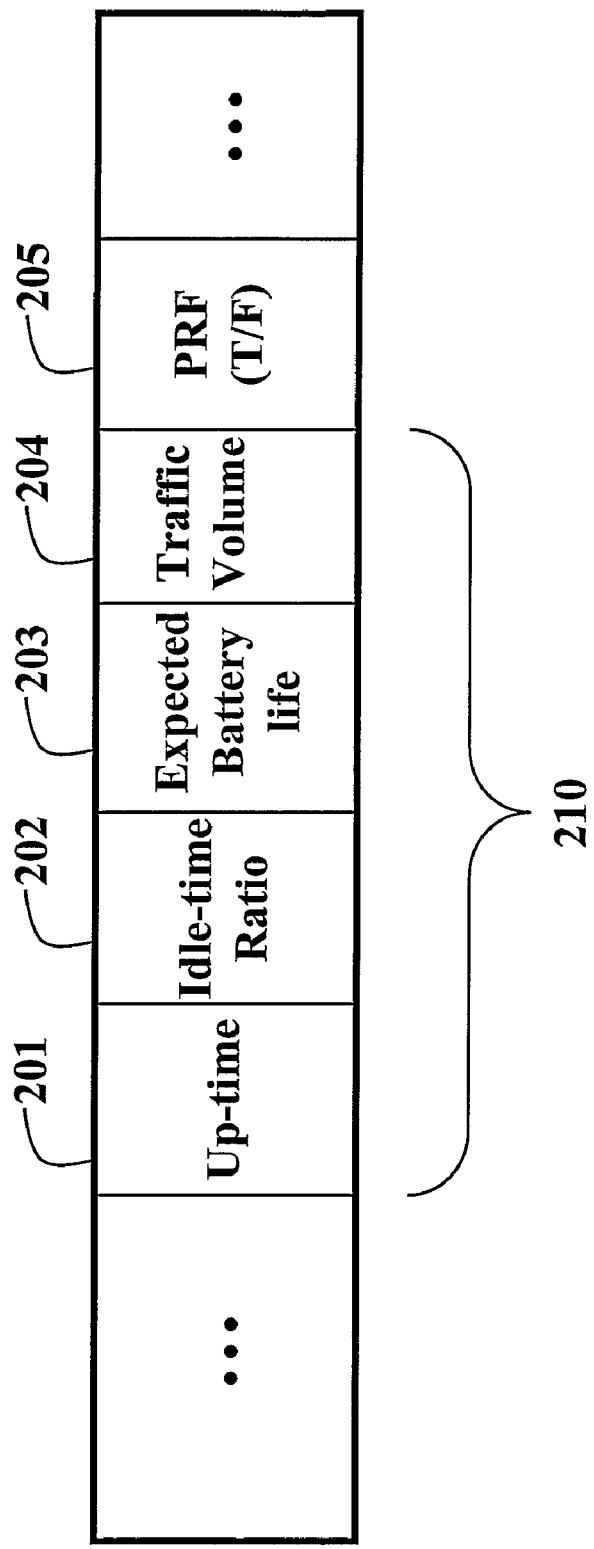
FIG. 2 is a block diagram of a PING frame according to the invention.

As shown in FIG. 2, the PING frame 200 according to the invention, in addition to conventional fields, e.g., addresses, check sums, etc., includes state information 210 of the node unicasting the PING frame. The state information can include up-time 201, idle time ratio 202, expected battery life 203, and a measure of the traffic volume 204 of the unicasting node. The PING frame 200 also includes a PING reply flag (PRF) 205. The PRF is set to either true or false (T/F).

Ping Reply Flag

If PRF 205 is set to FALSE, then the node sending the PING frame does not expect to receive a PING reply frame from a receiving node. The node assumes that the PING frame is transmitted and received as indicated by a mandatory ACK frame that is used for verifying unicast transmissions in the network. If the PRF is set to TRUE, then the node receiving the PING frame replies with a corresponding PING reply frame to the node that sent the PING frame. This unicast exchange is considered a wireless 'ping'. The PING frames are used to verify the integrity of the wireless channel between two immediately adjacent nodes in direct radio communications contact with each other.

Route Discovery

RREQ

Figure 3:
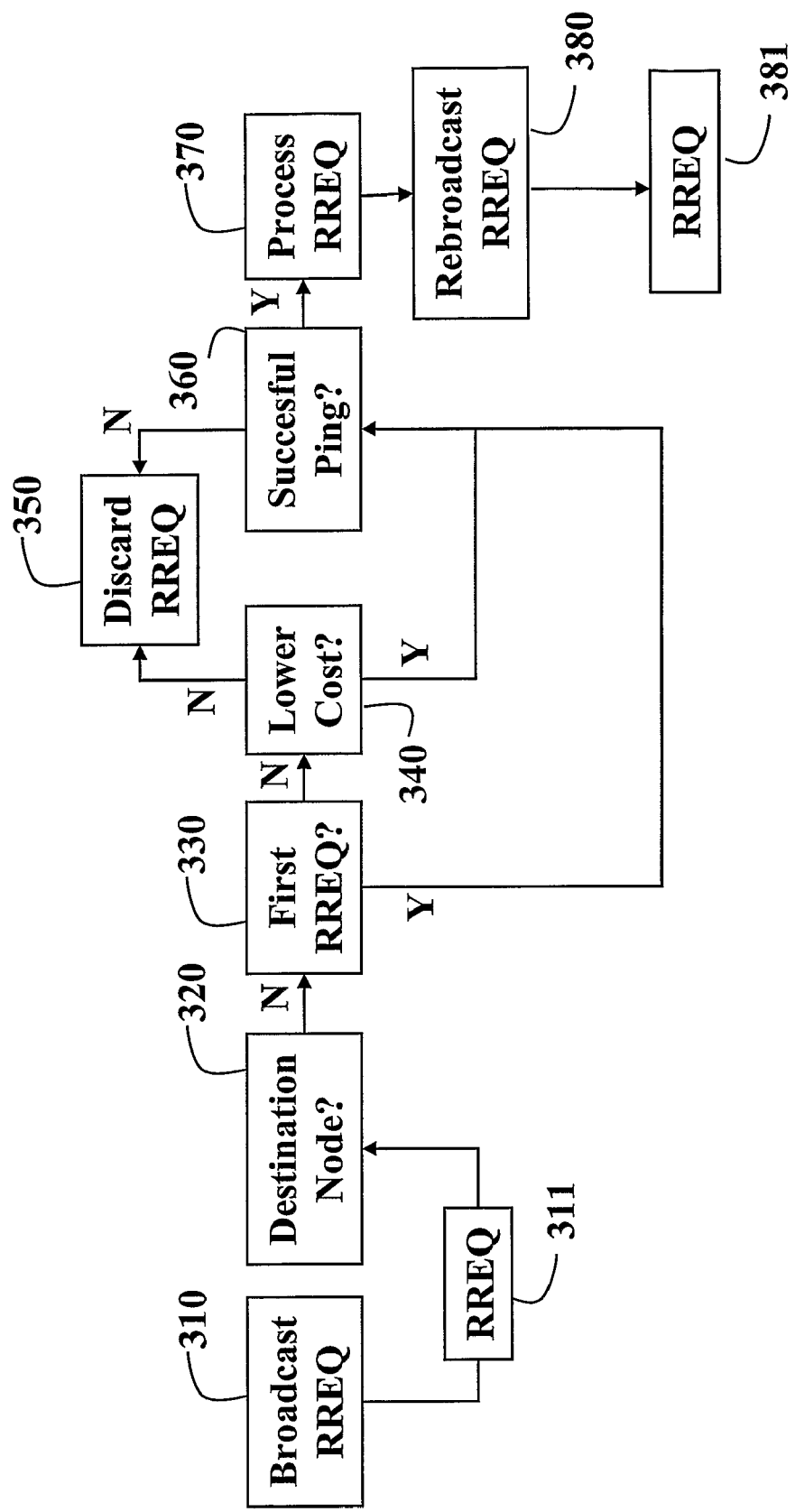
FIG. 3 is a flow diagram of processing a route request frame.

As shown in FIG. 3, to discover a route from a source node to a destination node according to the invention, the source node broadcasts 310 a conventional RREQ frame 311 over the wireless communications channels of the network. The RREQ frame includes addresses of the source and destination nodes, a request identification (ID), and an accumulated cost of the route. Other fields, as known in the art, can also be included.

Each node that receives the RREQ frame, determines 320 if the node is the destination node by comparing the destination address contained in RREQ frame with the address of the node. The receiving node can be an intermediate node or the destination node. Processing of the RREQ frame at the destination node is described below.

A node can receive multiple copies of the RREQ frame with the same ID. Therefore, the node determines 330 whether this is the first RREQ frame for a particular frame ID. The node always processes the first RREQ received. For any subsequent copy of the RREQ frame with the same ID, the node determines 340 if the accumulated cost in the currently received RREQ frame is lower than the cost for any previously processed RREQ frames, and discards 350 the RREQ frame otherwise.

Then, the receiving node 'pings' 360 the node broadcasting the RREQ frame directly via the communications channel linking the sending and receiving nodes. The PRF is set to FALSE to reduce traffic overhead associated with route discovery. If the ping is unsuccessful, then the node discards 350 the RREQ frame.

If the ping is successful and the node is not the destination node, then the node processes 370 the RREQ frame conventionally, for example, entries are updated in a local routing table of the node, and address fields and the accumulated cost in the RREQ frame are updated. The node waits for a random time period, and rebroadcasts 380 the updated RREQ frame 381.

RREP

Figure 4:
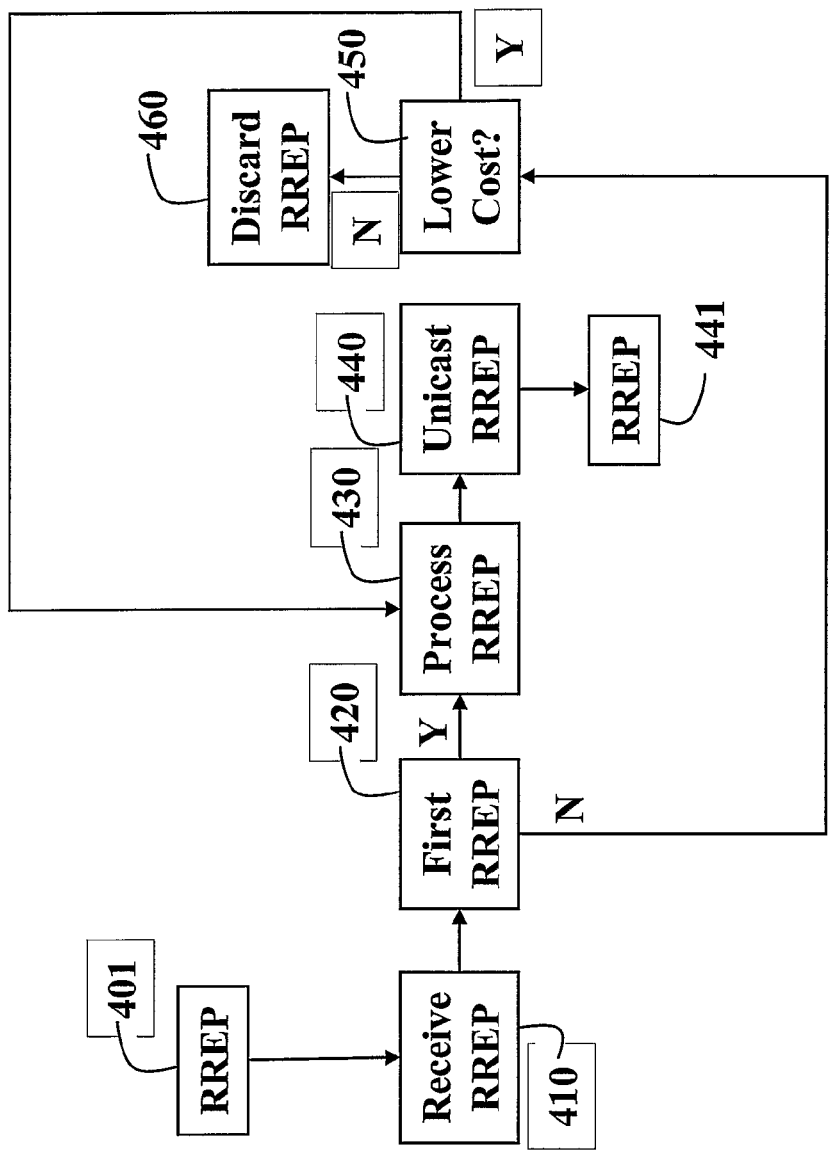
FIG. 4 is a flow diagram of processing a route reply frame according to the invention.

As shown in FIG. 4, a node can later receive 410 one or more RREP frames 401 corresponding to the RREQ frame with the same ID. The node determines 420 if this is the first RREP frame. If true, then the node processes 430 the RREP frame by updating entries in a local route table and the fields in the RREP frame. Then, the node unicasts 440 the updated RREP frame 441 to the node that sent the corresponding RREQ frame.

For any subsequently received RREP frames, the node determines 450 if the cost is lower. The RREP frame is discarded 460 if the cost is greater, otherwise the RREP frame is processed as described above.

Destination Node Processing

Figure 5:
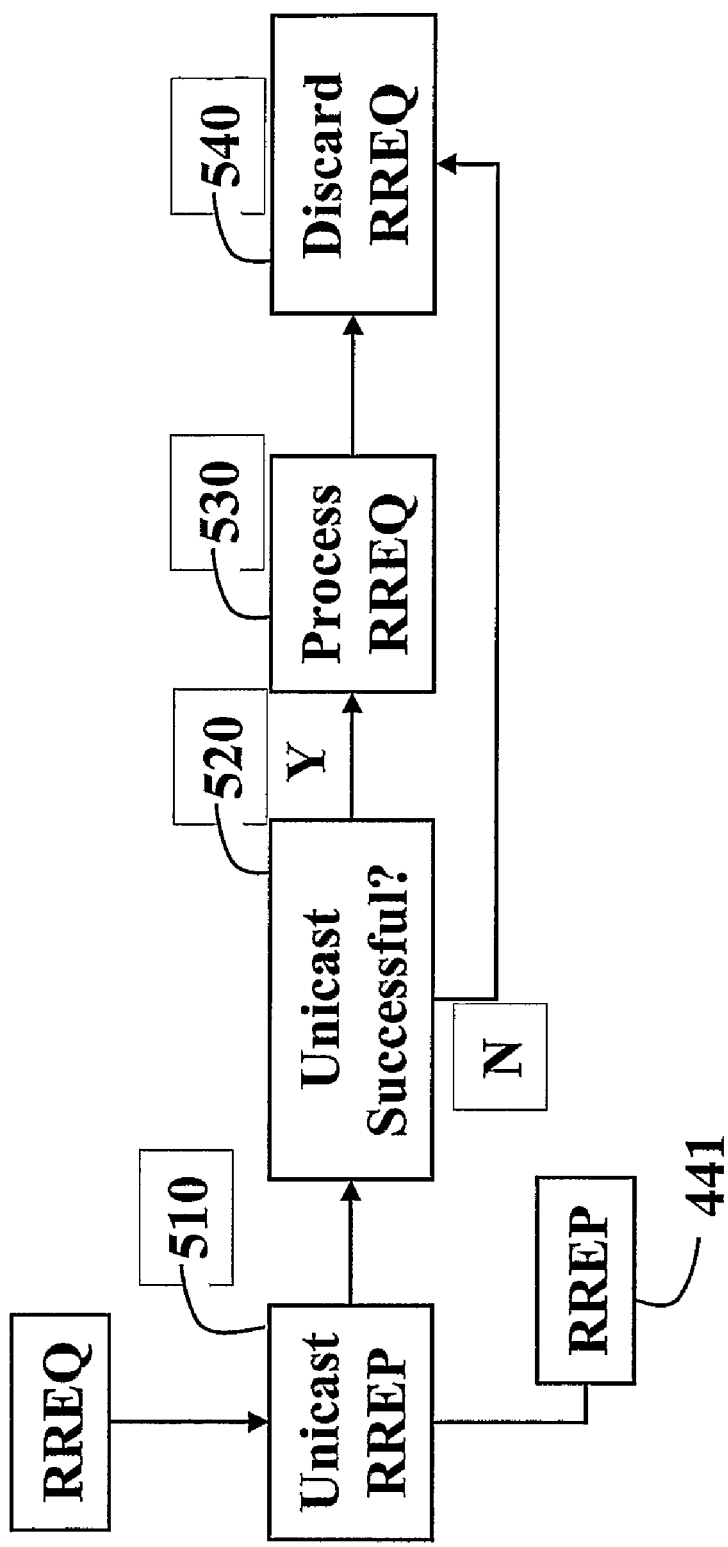
FIG. 5 is a flow diagram of processing at a destination node according to the invention.

FIG. 5 shows the steps performed by the destination node when the RREQ frame is received. The destination node unicasts 510 the updated RREP frame 441 to the node that broadcasted the RREQ frame and determines 520 if the unicast was successful.

If RREP frame was successfully unicast, the RREQ frame is processed 530 as described above, i.e., the local route table is updated.

If the unicast of the RREP frame failed, then the RREQ frame is discarded 540. Typically, a predetermined number of retries, e.g., three, are attempted. As described above, the destination node can also receive multiple copies of the same RREQ frame.

The destination node processes a subsequently received RREQ frame only if either of the following two conditions is true: the cost in subsequently received RREQ frame is less than the cost in any previously processed frames or a previous attempt to unicast the RREP failed and no cost is available.

If the transmission of RREP frames for all copies of the RREQ frame fails, then a route cannot be established to the destination node.

When the RREP frame is received in the source node, the source node can send DATA frames to the destination node, knowing that the integrity of the entire route has been verified.

EFFECT OF THE INVENTION

A method discovers a route between a source node and a destination node in a wireless communications network.

The method uses frames with a reduced scope. That is, the PING frame is unicast only to a node that sent a RREQ frame. The PING frame according to the invention can only be unicast to a neighboring node, that is, the node that sent the RREQ frame. In other words, the PING frame cannot be communicated along multi-hop paths and so, cannot be sent to remote nodes.

The PING frame is used to verify a backward wireless connectivity between two nodes before any further resources are committed to processing incoming RREQ frames.

The PING frame is very useful for exchanging vital information among neighboring nodes. The information that is exchanged in PING frames can be used constructively for better network management.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for discovering a route in a wireless communications network, the wireless communications network including a plurality of nodes, comprising:
   broadcasting, in a first node of a wireless communications network, a RREQ frame to discover a route;
   receiving, in a second node of the wireless communications network, the RREQ frame;
   unicasting, from the second node to the first node, a PING frame to verify an integrity of a wireless communications channel between the first node and the second node; and
   unicasting, from the second node to the first node, a RREP frame only if the integrity of the wireless channel is verified.

2. The method of claim 1, in which the PING frame includes state information of the second node.

3. The method of claim 2, in which the state information includes up-time, idle time ratio, expected battery life, and a measure of the traffic volume.

4. The method of claim 1, in which the PING frame includes a ping reply flag.

5. The method of claim 4, further comprising:
   unicasting, from the first node to the second node in response to receiving the PING frame, a PING reply frame only if the ping reply flag is true.

6. The method of claim 4, further comprising:
   responding, from the first node to the second node in response to receiving the PING frame, with an ACK frame if the ping reply flag is false.

7. The method of claim 1, in which the RREQ frame includes an address of a source node, an address of a destination node, a request identification and an accumulated cost of the route.

8. The method of claim 7, in which the first node is the source node and the second node is the destination node.

9. The method of claim 7, in which the first node is the source node and the second node is an intermediate node.

10. The method of claim 7, in which the first node is an intermediate node and the second node is the destination node.

11. The method of claim 7, in which the first node is a first intermediate node and the second node is a second intermediate node.

12. The method of claim 1, in which the second node receives multiple copies of the RREQ frame, and further comprising:
    processing always a first copy of the RREQ frame, and
    processing a subsequent copy of the RREQ frame only if the accumulated cost in the subsequent copy is less than the accumulated cost in the first copy, and discarding the subsequent copy otherwise.

13. The method of claim 9 or 11, in which the second node rebroadcasts the RREQ frame as an updated RREQ frame after a random time period.

14. The method of claim 10 or 11, in which the first node receives multiple copies of the RREP frame, and further comprising:
    processing always a first copy of the RREP frame, and
    processing a subsequent copy of the RREP frame only if the accumulated cost in the subsequent copy is less than the accumulated cost in the first copy, and discarding the subsequent copy otherwise.

15. The method of claim 7, further comprising:
    generating the RREP frame if the second node is the destination node.

16. The method of claim 7, further comprising:
    receiving the RREP frame in the source node; and
    unicasting DATA frames to the destination node in response to receiving the RREP frame.

17. A wireless communications network, the wireless communications network including a plurality of nodes, comprising:
    a first node of a wireless communications network configured to broadcast a RREQ frame to discover a route in the wireless communications network;
    a second node of the wireless communications network configured to receive the RREQ frame, the second node further comprising:
    means in the second node to unicast a PING frame to the first node to verify an integrity of a wireless communications channel between the first node and the second node; and
    means for unicasting, from the second node to the first node, a RREP frame only if the integrity of the wireless channel is verified.

18. A system configured for a wireless communications network, the wireless communications network including a plurality of nodes, comprising:
    means for broadcasting, in a first node of a wireless communications network, a RREQ frame to discover a route;
    means for receiving, in a second node of the wireless communications network, the RREQ frame;
    means for unicasting, from the second node to the first node, a PING frame to verify an integrity of a wireless communications channel between the first node and the second node; and
    means for unicasting, from the second node to the first node, a RREP frame only if the integrity of the wireless channel is verified.

* * * * *